United States Patent [19]
Ohkubo et al.

[11] Patent Number: 6,133,902
[45] Date of Patent: Oct. 17, 2000

[54] GRAY SCALE LEVEL REDUCTION METHOD, APPARATUS AND INTEGRATED CIRCUIT, AND COMPUTER READABLE MEDIUM STORING GRAY SCALE REDUCTION PROGRAM

[75] Inventors: Takafumi Ohkubo; Makoto Matsumoto, both of Tokyo, Japan

[73] Assignee: Mitsubishi Denki Kabushiki Kaisha, Tokyo, Japan

[21] Appl. No.: 08/976,046

[22] Filed: Nov. 21, 1997

[30] Foreign Application Priority Data

Jun. 16, 1997 [JP] Japan .................................. 9-159014

[51] Int. Cl.[7] ........................................................ G06F 3/14
[52] U.S. Cl. ............................................. 345/147; 345/467
[58] Field of Search ...................................... 345/147, 148, 345/149, 132, 113, 127, 150, 339, 327–328, 467; 358/200

[56] References Cited

U.S. PATENT DOCUMENTS

| | | | |
|---|---|---|---|
| 5,686,939 | 11/1997 | Millward et al. | 345/148 |
| 5,699,078 | 12/1997 | Yamazaki et al. | 345/147 |
| 5,703,621 | 12/1997 | Martin et al. | 345/147 |
| 5,781,176 | 7/1998 | Rey et al. | 345/147 |
| 5,861,869 | 1/1999 | Scheffer et al. | 345/147 |
| 5,910,805 | 6/1999 | Hickey et al. | 345/467 |
| 5,917,471 | 6/1999 | Choi | 345/147 |

*Primary Examiner*—Steven Sax
*Attorney, Agent, or Firm*—Leydig, Voit & Mayer, Ltd.

[57] ABSTRACT

A gray scale reduction method or apparatus reduces required memory capacity for storing gray scale as compared with conventional gray scale reduction methods. The gray scale reduction apparatus performs quantization error scattering of input gray level data of an input image. Data produced by the quantization error scattering is filtered after completing the quantization error scattering.

15 Claims, 17 Drawing Sheets

| 0 | $+\dfrac{1}{5}$ | 0 |
| --- | --- | --- |
| $+\dfrac{1}{5}$ | $+\dfrac{1}{5}$ | $+\dfrac{1}{5}$ |
| 0 | $+\dfrac{1}{5}$ | 0 |

| G(0,0) | G(1,0) | G(2,0) | G(3,0) | G(4,0) | G(5,0) | G(6,0) | G(7,0) |
|---|---|---|---|---|---|---|---|
| G(0,1) | G(1,1) | G(2,1) | G(3,1) | G(4,1) | G(5,1) | G(6,1) | G(7,1) |
| G(0,2) | G(1,2) | G(2,2) | G(3,2) | G(4,2) | G(5,2) | G(6,2) | G(7,2) |
| G(0,3) | G(1,3) | G(2,3) | G(3,3) | G(4,3) | G(5,3) | G(6,3) | G(7,3) |
| G(0,4) | G(1,4) | G(2,4) | G(3,4) | G(4,4) | G(5,4) | G(6,4) | G(7,4) |

| 0 | -1 | 0 |
|---|---|---|
| -1 | 4 | -1 |
| 0 | -1 | 0 |

FIG.19(PRIOR ART)

| G(X-1,Y-1) | -G(X,Y-1) | G(X+1,Y-1) |
|---|---|---|
| -G(X-1,Y) | 4G(X,Y) | -G(X+1,Y) |
| G(X-1,Y+1) | -G(X,Y+1) | G(X+1,Y+1) |

⇒ -G(X,Y-1)-G(X-1,Y)+4G(X,Y)-G(X+1,Y)-G(X,Y+1)

FIG.21(PRIOR ART)
| 1 | 2 | 4 | 2 | 1 |
|---|---|---|---|---|
| 2 | 4 | * | | |
FIG.22(PRIOR ART)
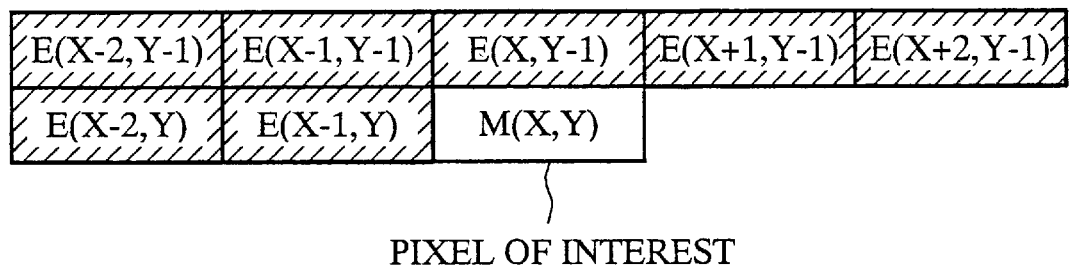
PIXEL OF INTEREST
FIG.24(PRIOR ART)
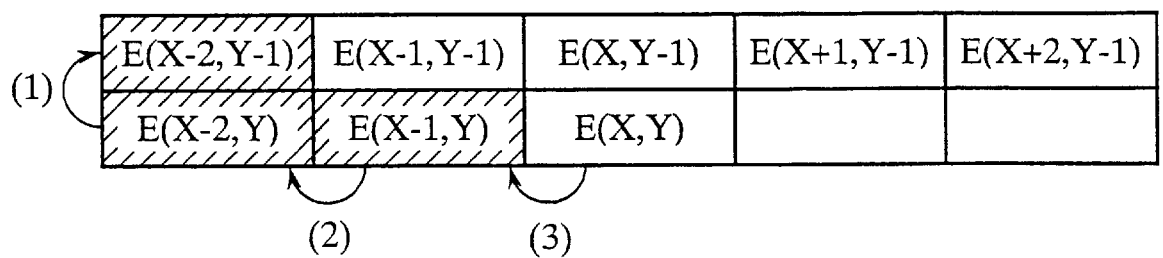

GRAY SCALE LEVEL REDUCTION METHOD, APPARATUS AND INTEGRATED CIRCUIT, AND COMPUTER READABLE MEDIUM STORING GRAY SCALE REDUCTION PROGRAM

BACKGROUND OF THE INVENTION

1. Field of the Invention

The present invention relates to a gray scale reduction method, apparatus and integrated circuit and a computer readable recording medium storing a gray scale reduction program, which are applicable to image processing in copy machines, facsimile machines, printers, scanners. More particularly, the present invention relates to the gray scale reduction method, apparatus and integrated circuit and the computer readable recording medium storing a gray scale reduction program, which can reduce the number of gray levels of an input image by quantization involving filtering and quantization error scattering to produce a gray scale reduced image such as a binary image.

2. Description of Related Art

FIG. 16 is a block diagram showing a facsimile image data processor (M66333FP: a gray scale binarization processor) described on pp. 4-148–4-167 of "95 Mitsubishi Semiconductor Data Book, Digital ASSP Edition", published in August, 1995. The gray scale reduction processor as shown in FIG. 16 converts an input image with multiple gray levels represented by multiple bits to a binary image with each pixel represented by a single bit.

In FIG. 16, the reference numeral 41 designates an input buffer which receives an input image from an input device such as a scanner, and sequentially outputs gray level information of each pixel of an input image; 42 designates a sharpening means for performing an MTF (Modulation Transfer Function) processing, filtering the input gray level data, and outputting modified gray level data; 43 designates an input data storing means for storing the input gray level data of the pixels required for the MTF processing; 44 designates an error scattering means for producing error scattered gray level data by performing quantization error scattering of the modified gray level data; 46 designates a quantization means for performing quantization (binarization) of the error scattered gray level data and outputs binary gray level data; 47 designates a quantization error computing means for outputting quantization error data corresponding to the difference of the binary gray level data with respect to the error scattered gray level data; 45 designates an error data storing means for storing the quantization error data and for supplying the error scattering means with the quantization error data; and 48 designates an output buffer for outputting the binary gray level data to the outside.

Next, the operation of the conventional apparatus will be described.

The input gray level data of each pixel output from the input buffer 41 is supplied to the sharpening means 42 and simultaneously stored in the input data storing means 43. Receiving the input gray level data of the current input pixel and the input gray level data of previous pixels from the input data storing means 43, the sharpening means 42 outputs modified gray level data corresponding to the pixel of interest on the basis of the multiple pixels. The modified gray level data is input to the error scattering means 44. Receiving, in addition to the modified gray level data, the quantization error data of the previous pixels from the error data storing means 45, the error scattering means 44 produces the error scattered gray level data corresponding to the input pixel on the basis of the quantization error data. Next, the quantization means 46 performs quantization (binarization) of the error scattered gray level data with respect to a predetermined threshold level, and outputs the binary gray level data to the outside through the output buffer 48. On the other hand, the quantization error computing means 47 produces the difference of the binary gray level data against the error scattered gray level data, as the quantization error data to be stored in the error data storing means 45 which outputs the data to the error scattering means 44 during the processing of the error scattering of the subsequent pixels.

In brief, the conventional gray scale reduction processor or method first carries out the filtering of the input image, and subsequently performs the error scattering and quantization of the filtered image.

Incidentally, the MTF processing (sharpening) is a process of adding to an original image differentiated components to the input image to enhance the contour of the image, which is used as one of the filtering techniques like a smoothing technique.

The error scattering, on the other hand, is also called average error minimizing processing. Quantizing each pixel individually presents a problem of increasing the quantization error of the overall image, thereby increasing the distortion of the image. The error scattering is used in conjunction with the quantization as a technique for restricting the distortion and obtaining an image of a more natural touch.

The quantization is a process of comparing the input gray level data with the predetermined threshold value, and replacing the input gray level data by the value corresponding to the comparison results, thereby producing new gray level data (that is, the quantization gray level data). For example, the binarization uses a single threshold value, and outputs the quantization gray level data of "1" if the gray level data exceeds the threshold value, or the quantization gray level data of "0" if the gray level data is less than the threshold value.

The quantization error refers to a gray level difference between the quantization gray level data and the gray level data input to the quantization (the error scattered gray level data in the example above). In the foregoing example, the quantization error is given as the difference obtained by subtracting the quantization error scattered data from the quantization gray level data when matching "0" of the quantization gray level data to the darkest gray level of the quantization error scattered data, and "1" to the brightest level thereof. The quantization error Ek involved in quantizing the luminance k of an original image using the middle luminance level t of the brightest level as the threshold value is expressed as follows:

$$Ek = k - 1 \times 2t \quad (k \geq t)$$
$$Ek = k + 0 \times 2t \quad (k < t) \tag{1a}$$

The binary data Bk for the luminance k of the original image are expressed by the following equations.

$$Bk = 1 \quad (k \geq t)$$
$$Bk = 0 \quad (k < t) \tag{1b}$$

With the arrangement as described above, the conventional gray scale reduction method and apparatus have a problem in that the memory capacity required for the input data storing means 43 and error data storing means 45 increases as the number of pixels per line of the image increases. This causes a problem, when manufacturing a gray scale reduction integrated circuit, in that an increase in the chip size due to the increasing memory area hinders the large scale integration, or causes another problem, when manufacturing a computer readable medium storing a gray scale reduction program, in that a larger memory capacity is required for implementing the program.

In particular, it is an inevitable trend that higher resolution images will be increasingly required in office automation equipment like copy machines and facsimile machines which need the gray scale reduction. This in turn strongly requires the development of a gray scale reduction integrated circuit that can readily handle high resolution images such as 800 dpi (dots per inch) or 1200 dpi.

FIG. 17 is a schematic diagram of the input image structure. In this figure, each block indicates the display position of a pixel P(X,Y), and the function G(X,Y) depicted in the block represents the luminance of the pixel P(X,Y). The luminance G(X,Y) of each pixel has one to one correspondence with the input gray level data of that pixel.

FIG. 18 is a filter matrix diagram illustrating a filtering of the input image. The filter matrix consists of a widely used 3×3 matrix, in which the filtering is carried out using four neighboring pixels about the pixel at the center block (generally called a pixel of interest). FIG. 19 is a schematic diagram illustrating the filtering of the pixel of interest P(X,Y) using this filter. Incidentally, the filter as shown in FIG. 18 is generally called Laplacian filter, and the MTF processed value (modified gray level data) M(X,Y) is given by the following equation.

$$M(X,Y)=G(X,Y)-G(X,Y-1)-G(X-1,Y)+4G(X,Y)-G(X+1,Y)-G(X,Y+1) \quad (2)$$

When the pixels on the top or bottom line or on the rightmost or leftmost column are used as the pixel of interest, luminance shortage will occur in part of the neighboring pixels. It is usually compensated for by the luminance corresponding to the white level for the further processing.

FIG. 20 is a block diagram showing the memory structure of the input data storing means 43 and its peripheral means. This figure illustrates the state at the timing the luminance G(X,Y+1) of the pixel P(X,Y+1) is input to the sharpening means 42, in which case the pixel of interest of the MTF processing is P(X,Y). As shown in this figure, the MTF processing of the pixel P(X,Y) can be carried out by outputting from the input data storing means 43 the luminance data G(X,Y-1), G(X-1,Y), G(X,Y) and G(X+1,Y) of the four pixels at the timing the luminance G(X,Y+1) of the pixel P(X,Y+1) is input to the sharpening means 42. In the MTF processing, it is sufficient for the input data storing means 43 to have a memory capacity that can store the input gray level data of pixels contained in two lines. For example, when processing the next pixel of interest P(X+1,Y), the memory can store the neighboring pixel data G(X+1,Y-1), G(X,Y), G(X+2,Y) and G(X+1,Y+1) by removing G(X,Y-1) and storing G(X,Y+1).

Accordingly, the input data storing means 43 must include a memory with a capacity for storing the gray level data of two lines.

FIG. 21 is a filter matrix diagram illustrating an example of an error scattering of the modified image obtained as the result of the filtering. The filter matrix shown in this figure is a widely used matrix, and the error scattering of the pixel of interest indicated by the "*" mark in this figure is carried out using the quantization error data E(M,N) of the seven neighboring pixels. FIG. 22 is a schematic diagram illustrating the error scattering of the pixel of interest P(X,Y) using this filter. The error scattering gives the error scattered value (error scattered gray level data) L(X,Y) expressed by the following equation.

$$L(X,Y)=M(X,Y)+\{E(X-2,Y-1)+2E(X-1,Y-1)+4E(X,Y-1)+2E(X+1,Y-1)+E(X+2,Y-1)+2E(X-2,Y)+4E(X-1,Y)\}/16 \quad (3)$$

When the pixels on the top or bottom line or on the rightmost or leftmost column are used as the pixel of interest, a shortage of the quantization error data will occur in part of the neighboring pixels. The quantization error data of these pixels are usually handled as "0" (without error).

FIG. 23 is a block diagram showing the memory structure of the error data storing means 45 and its peripheral means. This figure illustrates the state at the timing the MTF processed value M(X,Y) of the pixel P(X,Y) is input to the error scattering means 44, in which case the pixel of interest of the MTF processing is P(X,Y). As shown in this figure, the error scattering of the pixel P(X,Y) can be carried out by outputting from the error data storing means 45 the error data of the seven pixels E(X-2, Y-1), E(X-1,Y-1), E(X, Y-1), E(X+1,Y-1), E(X+2,Y-1), E(X-2,Y) and E(X-1,Y) at the timing the MTF processed value M(X,Y) of the pixel P(X,Y) is input to the error scattering means 44. In the error scattering, it is sufficient for the error data storing means 45 to have a capacity that can store input gray level data of one line plus two pixels. For example, when processing the next pixel of interest P(X+1,Y), the memory can store the error data of the neighboring pixels E(X-1,Y-1), E(X,Y-1), E(X+1,Y-1), E(X+2,Y-1), E(X+3,Y-1), E(X-1,Y) and E(X,Y) by removing E(X-2,Y-1) and storing E(X,Y).

Accordingly, the error data storing means 45 must have a capacity for storing data of one line plus two pixels.

FIG. 24 is a diagram illustrating the error data update operation of the error data storing means 45. As shown in this figure, once the error data E(X,Y) of the pixel of interest P(X,Y) has been obtained, the update is carried out by overwriting the second previous error data E(X-2,Y) on the area having stored the error data E(X-2,Y-1) of the previous line, by overwriting the error data E(X-1,Y) immediately previous to the pixel of interest P(X,Y) on the area having stored the error data E(X-2,Y), and by overwriting the error data E(X,Y) of the pixel of interest on the memory area having stored the E(X-1,Y). Thus, each time the error scattering of one line has been completed, the memory area which has stored the error data E(M,Y-1) is updated by the next line error data E(M,Y) (which means that the error data of the immediately previous line of the pixel of interest is always stored), and the memory area which has stored the error data E(M,Y) is updated by the next line error data E(M,Y+1) (which means that the error data of the line of the pixel of interest is always stored). This makes it possible to iterate the error computation by accessing the same memory area, thus improving the processing efficiency and simplifying the processing logic.

In summary, the conventional gray scale reduction method or apparatus requires memory areas of at least:

(1) two lines of input gray level data of pixels in the input data storing means 43; and (2) one line plus two pixels of error data in the error data storing means 45.

Accordingly, an input image even with B4 size, 200 dpi and 8-bit gray level data requires 2048 pixels per line, and the minimum required memory capacity Mmin for 8-bit processing of the image becomes:

$$Mmin=2048(pixels)\times(2+1)(lines)\times8(bits)+2(pixels)\times8(bits)=49,168(bits) \quad (4)$$

Thus, about 48 Kbit data memory capacity is required.

SUMMARY OF THE INVENTION

The present invention is implemented to solve the foregoing problem. It is therefore an object of the present invention to provide gray scale reduction method, apparatus and integrated circuit and a computer readable medium storing a gray scale reduction program, which can reduce the memory capacity for the processing as compared with the conventional gray scale reduction methods.

According to a first aspect of the present invention, there is provided a gray scale reduction method for producing an output image with a reduced number of gray levels by reducing a number of gray levels of input gray level data of an input image, the gray scale reduction method comprising the steps of: performing quantization error scattering of the input gray level data of the input image; and performing filtering of data produced by the quantization error scattering after completing the step of quantization error scattering. This enables the filtering and quantization error scattering to share the gray level data stored in the same memory, and thus makes it possible to reduce the total capacity of the memory needed for the gray scale reduction.

Here, the step of performing quantization error scattering may obtain temporary quantization gray level data and quantization error data by performing, on the input gray level data, error scattering and temporary quantization; the gray scale reduction method may further comprise the step of storing the temporary quantization gray level data and the quantization error data, and the step of regenerating gray level data of each pixel from the temporary quantization gray level data and the quantization error data, and may input the regeneration gray level data to the step of filtering and the quantization error scattering. This makes it possible to reduce the memory capacity at least by an amount of (the bit number of the input gray level data–the bit number of the temporary quantization gray level data) for each pixel.

The step of performing filtering may use only the regeneration gray level data as gray level data of a plurality of pixels used for the filtering.

The step of performing filtering for each pixel may use, as gray level data of a particular pixel being processed, data selected from the input gray level data, and uses, as gray level data of all remaining pixels being processed, data selected from the regeneration gray level data. This makes it possible to further reduce the memory capacity by an amount corresponding to one pixel by matching the timing of the filtering to the input timing of the input gray level data.

A pixel of interest in the step of filtering may be a pixel one line previous to a pixel of interest in the step of quantization error scattering. This makes it possible to overlap the pixels to be used by the filtering and the quantization error scattering at any timings, and thus to take full advantage of the memory reduction due to the memory sharing.

According to a second aspect of the present invention, there is provided a gray scale reduction apparatus comprising: error scattering means for sequentially receiving input gray level data of each pixel of an input image, and for producing error scattered gray level data by performing quantization error scattering of the input gray level data of each pixel of the input image; temporary quantization means for producing temporary quantization gray level data by performing temporary quantization of the error scattered gray level data; quantization error computing means for producing quantization error data corresponding to a difference of each of the temporary quantization gray level data with respect to the error scattered gray level data; error data storing means for storing the quantization error data, and for supplying the quantization error data to the error scattering means; temporary quantization gray level data storing means for storing the temporary quantization gray level data; gray level regenerating means for regenerating, from the temporary quantization gray level data and the quantization error data stored in the two storing means, regeneration gray level data output as gray level data of each pixel; filtering means for carrying out filtering based on the regeneration gray level data, and for outputting filtered data as modified gray level data; and quantization means for performing quantization based on the modified gray level data, and for outputting quantization gray level data with a smaller number of gray levels than the input image. This makes it possible to reduce the memory capacity at least by an amount of (the bit number of the input gray level data–the bit number of the temporary quantization gray level data) for each pixel.

Here, the filtering means may perform filtering of each pixel using only the regeneration gray level data fed from the gray level regenerating means.

The filtering means may perform filtering of each pixel by using, as gray level data of a particular pixel being processed, data selected from the input gray level data, and by using, as gray level data of all remaining pixels being processed, data selected from the regeneration gray level data, and a pixel of interest in the filtering may be a pixel one line previous to a pixel of interest processed by the error scattering means. This makes it possible to further reduce the memory capacity by an amount corresponding to one pixel by matching the timing of the filtering to the input timing of the input gray level data, and to overlap the pixels to be used by the filtering and the quantization error scattering at any timings, and thus to take full advantage of the memory reduction due to the memory sharing.

The filtering means may perform sharpening based on the regeneration gray level data.

The filtering means may perform smoothing based on the regeneration gray level data.

The gray scale reduction apparatus may convert the input gray level data of each pixel of the input image into 1-bit gray level data to be output.

The gray scale reduction apparatus may convert the input gray level data of each pixel of the input image into two-or-more-bit gray level data to be output.

The error data storing means and the temporary quantization gray level data storing means may each comprise a line memory. This make it possible to update the contents of the line memory by a simple operation.

The quantization error data may have a greater number of bits than the input gray level data.

The gray scale reduction apparatus may be formed into an integrated circuit.

In a third aspect of the present invention, there is provide a computer usable medium having computer readable program code means embodied in the medium for causing a gray scale reduction of an input image as implemented by the foregoing gray scale reduction apparatus.

BRIEF DESCRIPTION OF THE DRAWINGS

FIG. 17 is a diagram illustrating a pixel matrix of an input image;

FIG. 18 is a diagram illustrating a matrix of a sharpening filter;

FIG. 19 is a diagram illustrating the filtering of the gray level data by the sharpening filter of FIG. 18;

FIG. 21 is a matrix diagram illustrating an example of an error scattering filter;

FIG. 22 is a diagram illustrating the filtering of error data by the error scattering filter;

FIG. 24 is a diagram illustrating the data update operation in the error data storing means of FIG. 23.

DETAILED DESCRIPTION OF THE PREFERRED EMBODIMENTS

The invention will now be described with reference to the accompanying drawings.

EMBODIMENT 1

Figure 1:
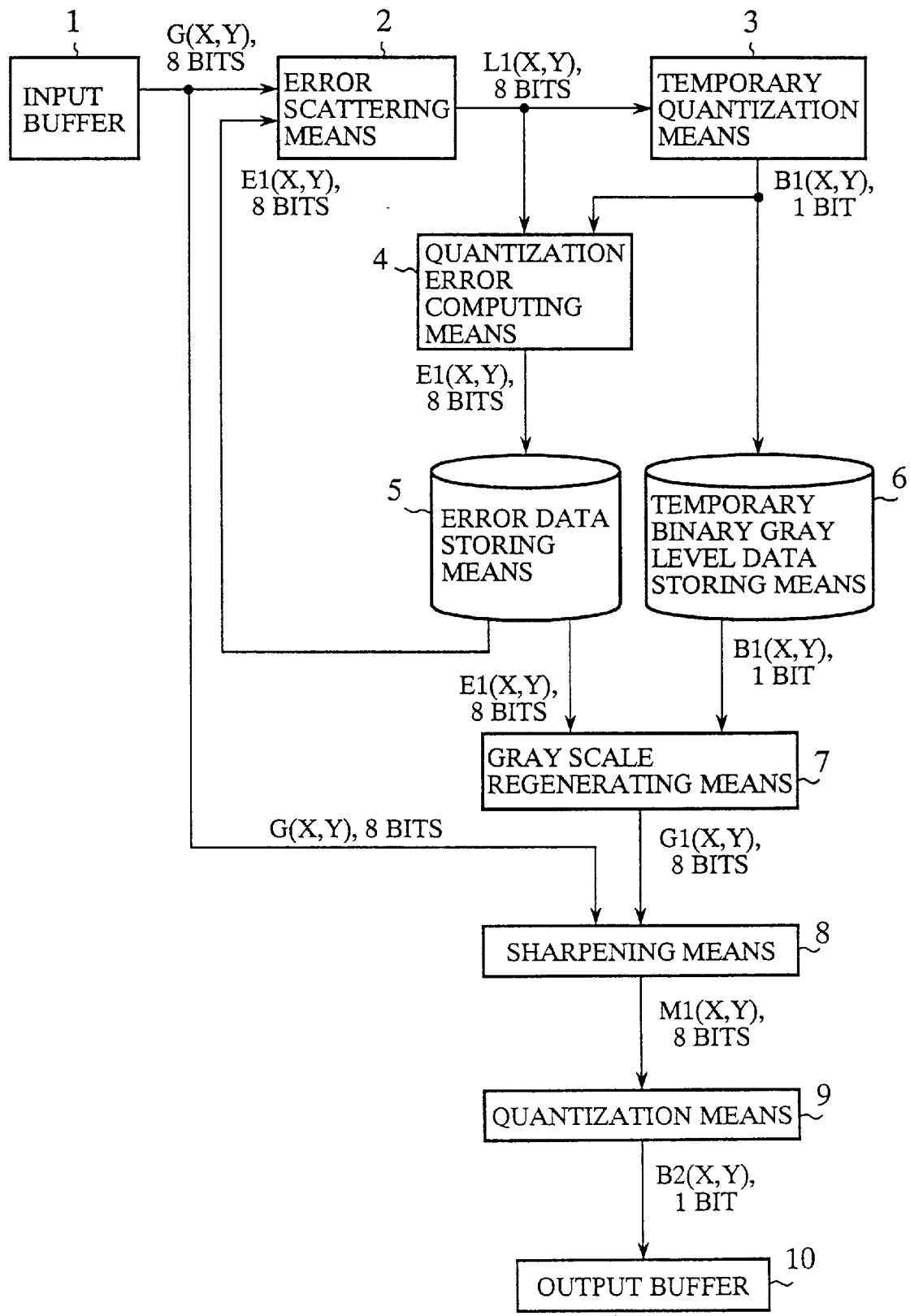
FIG. 1 is a block diagram showing an embodiment 1 of a gray scale reduction integrated circuit in accordance with the present invention.

FIG. 1 is a block diagram showing an embodiment 1 of a gray scale reduction integrated circuit (gray scale reduction processor) in accordance with the present invention. The gray scale reduction integrated circuit (gray scale reduction processor) receives gray level data pixel by pixel consisting of a plurality of bits from a scanner that reads an image of a document as input gray level data of an input image, and outputs a binary image based on the input image, that is, an image with its each pixel consisting of 1-bit gray level data.

In this figure, the reference numeral 1 designates an input buffer which receives an input image from an input device such as a scanner, and sequentially outputs gray level information for each of a plurality of pixels constituting the input image as 8-bit input gray level data G(X,Y) for each pixel P(X,Y); 2 designates an error scattering means which performs a quantization error scattering of the input gray level data G(X,Y) and outputs 8-bit error scattered gray level data L1(X,Y); 3 designates a temporary quantization means which performs temporary binarization (quantization) of the error scattered gray level data L1(X,Y) and outputs 1-bit temporary binary gray level data (temporary quantization gray level data) B1(X,Y); 4 designates a quantization error computing means for computing and outputting 8-bit quantization error data E1(X,Y) corresponding to the difference of the temporary binary gray level data B1(X,Y) against the error scattered gray level data L1(X,Y); 5 designates an error data storing means for storing the quantization error data E1(X,Y) and supplying it to the error scattering means 2; 6 designates a temporary binary gray level data storing means (temporary quantization gray level data storing means) for storing the temporary binary gray level data B1(X,Y); 7 designates a gray scale regenerating means for reconstructing 8-bit regeneration gray level data G1(X,Y) as gray level data of each pixel from the quantization error data El(X,Y) stored in the error data storing means 5 and the temporary binary gray level data B1(X,Y) stored in the temporary binary gray level data storing means 6; 8 designates a sharpening means (filtering means) which performs MTF (Modulation Transfer Function) processing based on the regeneration gray level data G1(X,Y) and outputs 8-bit modified gray level data M1(X,Y); 9 designates a quantization means which performs binarization (quantization) of the modified gray level data M1(X,Y) and outputs 1-bit binary gray level data (quantization gray level data) B2(X, Y); and 10 designates an output buffer for outputting the binary gray level data B2(X,Y) to the outside.

Next, the operation of the embodiment 1 will be described.

The input gray level data G(X,Y) of a pixel output from the input buffer 1 is input to the error scattering means 2. The error scattering means 2, also receiving the quantization error data E(X,Y) of the pixels required for the processing from the error data storing means 5, produces the error scattered gray level data L1(X,Y) of the pixel P(X,Y) from these input data. Receiving the error scattered gray level data L1(X,Y), the temporary quantization means 3 compares the input data L1(X,Y) with a predetermined threshold value of "1", and outputs a value "0" or "1" in this case) corresponding to the compared result as the temporary binary gray level data B1(X,Y) which is stored in the temporary binary gray level data storing means 6. The temporary binary gray level data B1(X,Y) is also input together with the error scattered gray level data L1(X,Y) to the quantization error computing means 4 which produces the difference of the temporary binary gray level data B1(X,Y) against the error scattered gray level data L1(X,Y) as the quantization error data E1(X,Y). The quantization error data E1(X,Y) is stored in the error data storing means 5 to be used as the quantization error data E1(X,Y) for the next pixel P(X+1,Y). The foregoing is the quantization error scattering and storing process.

With the quantization error scattering having been completed, the gray scale regenerating means 7 regenerates the gray level data of each pixel from the gray level data stored in the error data storing means 5 and temporary binary gray level data storing means 6, and outputs the regeneration gray level data G1(X,Y) as the gray level data of each pixel (gray level reproducing process). Receiving the regeneration gray level data G1(X,Y) together with the input gray level data G(X,Y), the sharpening means 8 produces the modified gray level data M1(X,Y) associated with each pixel (filtering process). The quantization means 9, receiving the modified gray level data M1(X,Y), compares it with the predetermined threshold value of "1", and outputs the value ("0" or "1" in this case) corresponding to the compared result as the binary gray level data B2(X,Y) (quantization process) which is output to the outside through the output buffer 10.

Structures and operations of the individual means and processes will now be described in more detail. In this embodiment 1, the input gray level data G(X,Y) consists of eight bits, and it takes the maximum luminance when the gray level data is "256" and the minimum luminance when the gray level data is "0".

Figure 2:
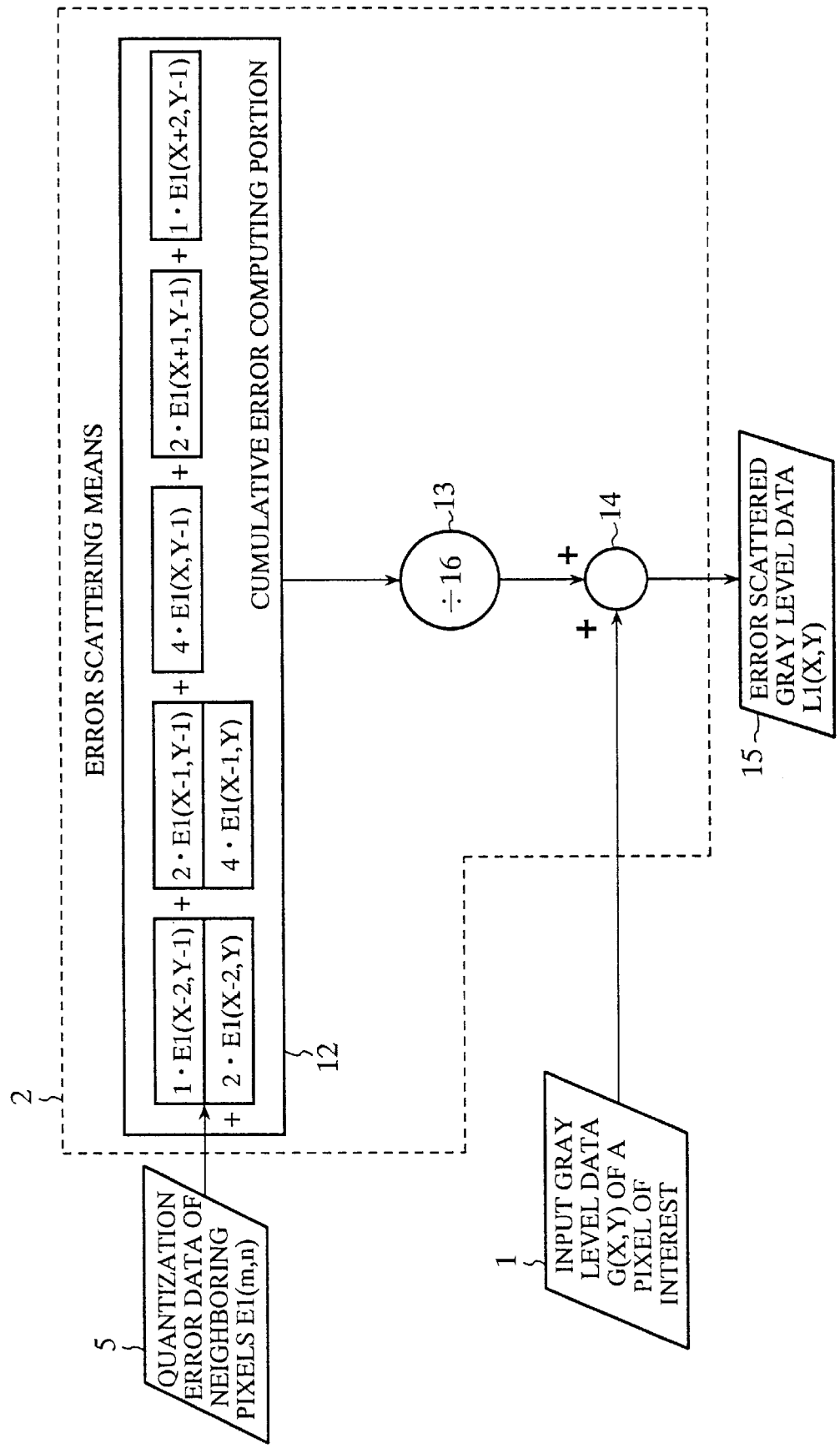
FIG. 2 is a block diagram showing an error scattering means 2 of FIG. 1.

FIG. 2 is a detailed block diagram of the error scattering means 2. The error scattering means 2, receiving a pixel from the input buffer 1 as the pixel of interest P(X,Y), makes an adjustment of the input gray level data G(X,Y) of the pixel of interest P(X,Y) in accordance with the quantization error data E1(X,Y) which is assumed to be generated when quantizing neighboring pixels of the pixel of interest P(X,Y), and outputs the gray level data after the adjustment as the quantization error scattered gray level data L1(X,Y). In FIG. 2, the reference numeral 12 designates an cumulative error computing portion of the quantization error data E1(X,Y) of the neighboring pixels fed from the error data storing means 5; 13 designates a divider for carrying out division for obtaining an average error, and 14 designates an adder for adding the division result to the input gray level data G(X,Y) of the pixel of interest P(X,Y).

Next, the operation of the error scattering means 2 will be described.

The cumulative error computing portion 12 reads error data E1(m,n) of neighboring pixels of the pixel of interest P(X,Y) and carries out calculation based on the following expression (5), where the neighboring pixels are denoted by P(X−2,Y−1), P(X−1,Y−1), P(X,Y−1), P(X+1,Y−1), P(X+2,Y−1), P(X−2,Y) and P(X−1,Y).

$$Esigma(X,Y)=1\times E1(X-2,Y-1)+2\times E1(X-1,Y-1)+4\times E1(X,Y-1)+2\times E1(X+1,Y-1)+1\times E1(X+2,Y-1)+2\times E1(X-2,Y)+4\times E1(X-1,Y) \quad (5)$$

Subsequently, the divider 13 computes the average error of the cumulative error Esigma by the following expression (6).

$$Eave=Esigma/16 \quad (6)$$

Finally, the adder 14 adds to the input gray level data G(X,Y) the average error Eave of the quantization error by the following expression (7).

$$L1(X,Y)=G(X,Y)+Eave \quad (7)$$

Then, the adder 14 outputs the error scattered gray level data L1(X,Y).

Figure 3:
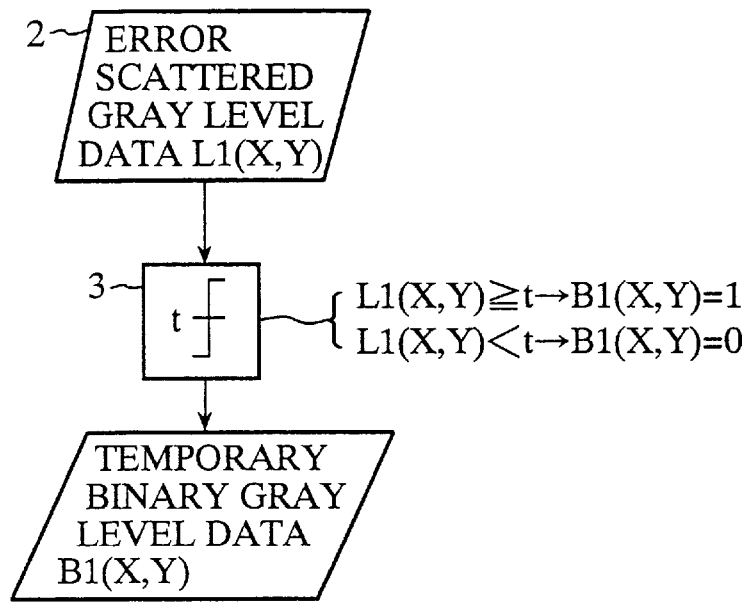
FIG. 3 is a block diagram showing a temporary quantization means 3 of FIG. 1.

FIG. 3 is a block diagram showing the temporary quantization means 3 in detail. The temporary quantization means 3 converts the error scattered gray level data L1(X,Y) output from the error scattering means 2 into binary gray level data using the predetermined threshold value t, and outputs the binary gray level data as the temporary binary gray level data B1(X,Y). In the present embodiment 1, the threshold value t is set at the median (128) of the 8-bit gray scale. Thus, the error scattered gray level data L1(X,Y) is equal to or greater than the threshold value is output as the binary gray level data B(X,Y) with a value of "1", whereas the error scattered gray level data L1(X,Y) less than the threshold value is output as the binary gray level data B(X,Y) with a value of "0".

Figure 4:
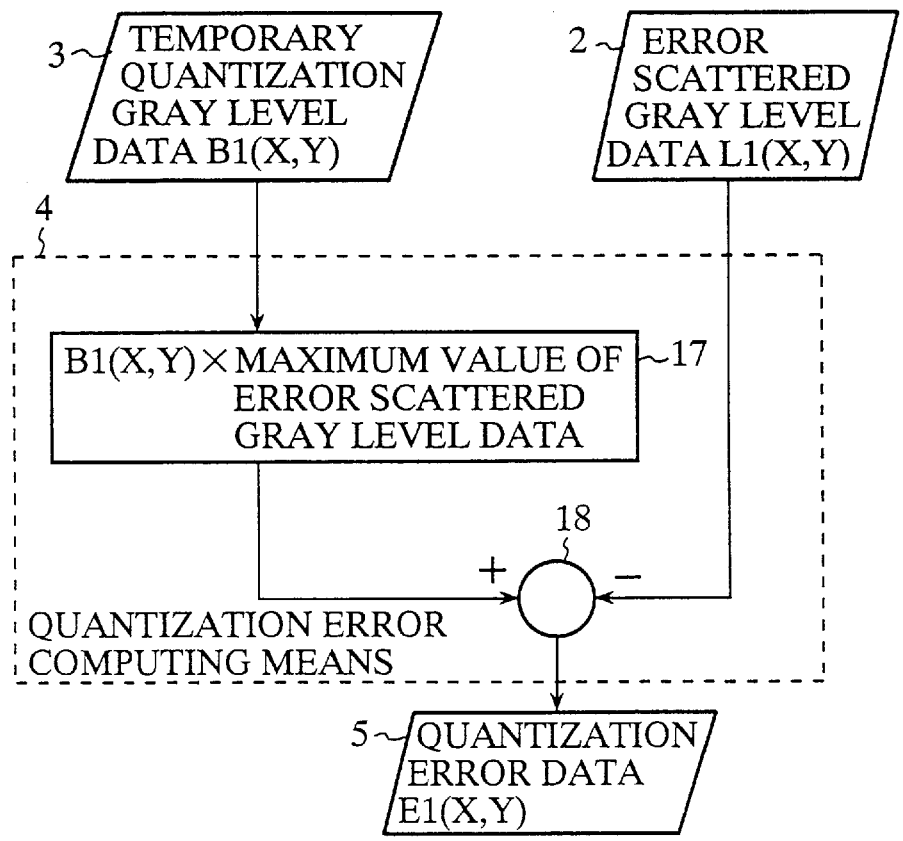
FIG. 4 is a block diagram showing a quantization error computing means 4 of FIG. 1.

FIG. 4 is a block diagram showing the quantization error computing means 4 in detail. The quantization error computing means 4 outputs, on the basis of the error scattered gray level data L1(X,Y) and temporary binary gray level data B1(X,Y) of the pixel P(X,Y), an error involved in the quantization of the gray level data of the pixel as the quantization error data E1(X,Y). In FIG. 4, the reference numeral 17 designates a reverse converter for reversely converting the temporary binary gray level data B1(X,Y) into input gray level data G(X,Y); and 18 designates a subtractor for obtaining the quantization error from the reversely converted value and the error scattered gray level data.

Next, the operation of the quantization error computing means 4 will be described.

The reverse converter 17 carries out the reverse conversion by multiplying the temporary binary gray level data B1(X,Y) by the maximum luminance data (256) of the input gray level data G(X,Y). Subsequently, the subtractor 18 subtracts the error scattered gray level data L1(X,Y) from the result of the reverse conversion, and outputs its result as the quantization error data E1(X,Y). Accordingly, the quantization error data E1(X,Y) is expressed by the following equation (8).

$$E1(X,Y)=B1(X,Y)\times 256-L1(X,Y) \quad (8)$$

Figure 5:
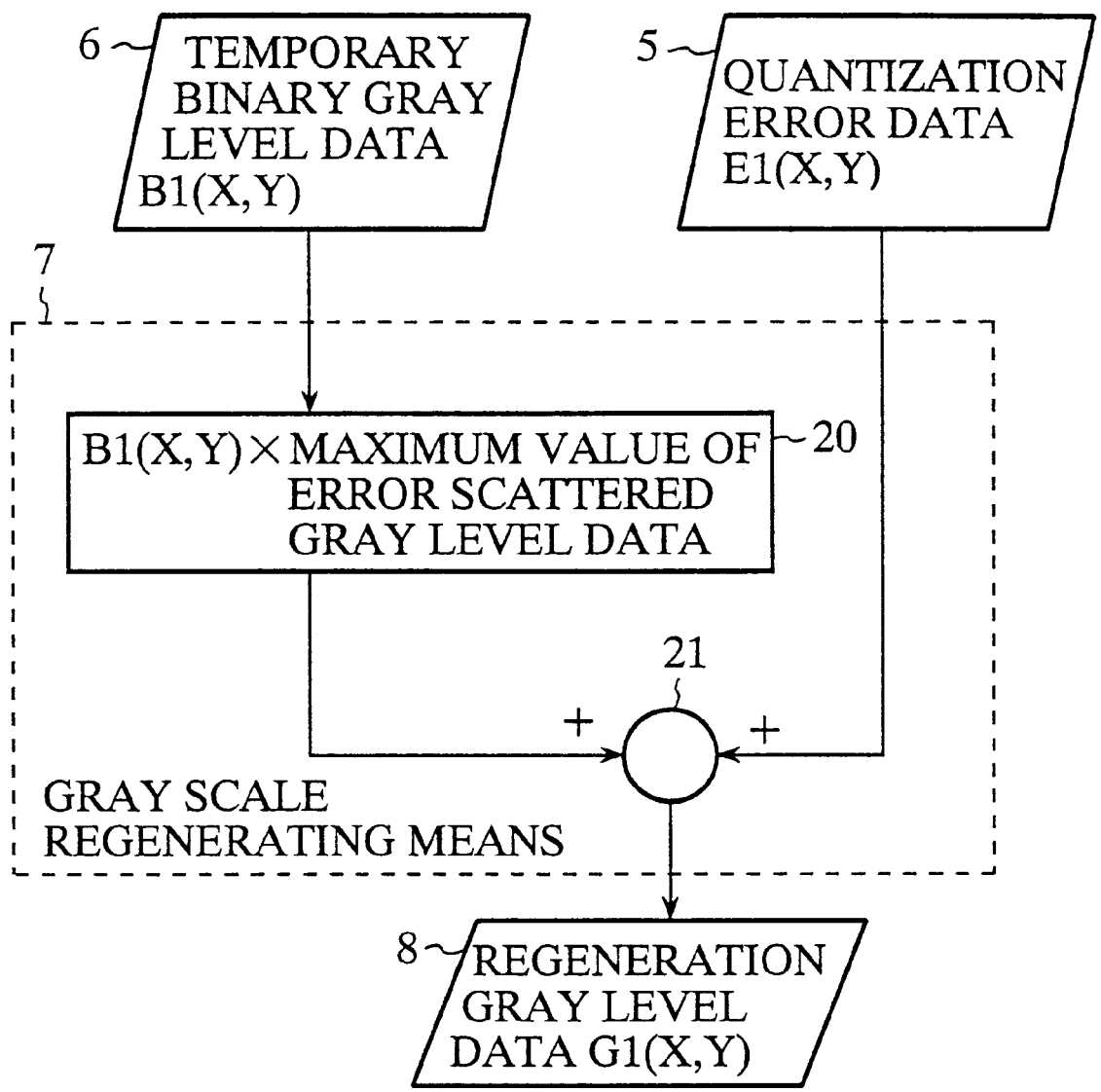
FIG. 5 is a block diagram showing a gray scale regenerating means 7 of FIG. 1.

FIG. 5 is a block diagram showing the gray scale regenerating means 7 in detail. The gray scale regenerating means 7 regenerates the gray level data of the pixels used by the sharpening means 8 from the quantization error data E1(X,Y) and temporary binary gray level data B1(X,Y), and outputs them. In FIG. 5, the reference numeral 20 designates a reverse converter for reversely converting the temporary binary gray level data B1(X,Y) into the input gray level data G(X,Y); and 21 designates an adder for adding the reversely converted value to the quantization error data E1(X,Y), and outputting regeneration gray level data.

Next, the operation of the gray scale regenerating means 7 will be described.

Receiving the quantization error data E1(X,Y) and the temporary binary gray level data B1(X,Y) associated with the pixel P(X,Y), the reverse converter 20 carries out the reverse conversion by multiplying the temporary binary gray level data B1(X,Y) by the maximum luminance data (256) of the input gray level data. Subsequently, the adder 21 adds the quantization error data E1(X,Y) to the result of the reverse conversion, and outputs its result as the regeneration gray level data G1(X,Y) of the pixel P(X,Y). Accordingly, the regeneration gray level data G1(X,Y) is expressed by the following equation (9), which is equal to the error scattered gray level data L1(X,Y) in the present embodiment 1.

$$G1(X,Y)=B1(X,Y)\times 256+E1(X,Y) \quad (9)$$

Figure 6:
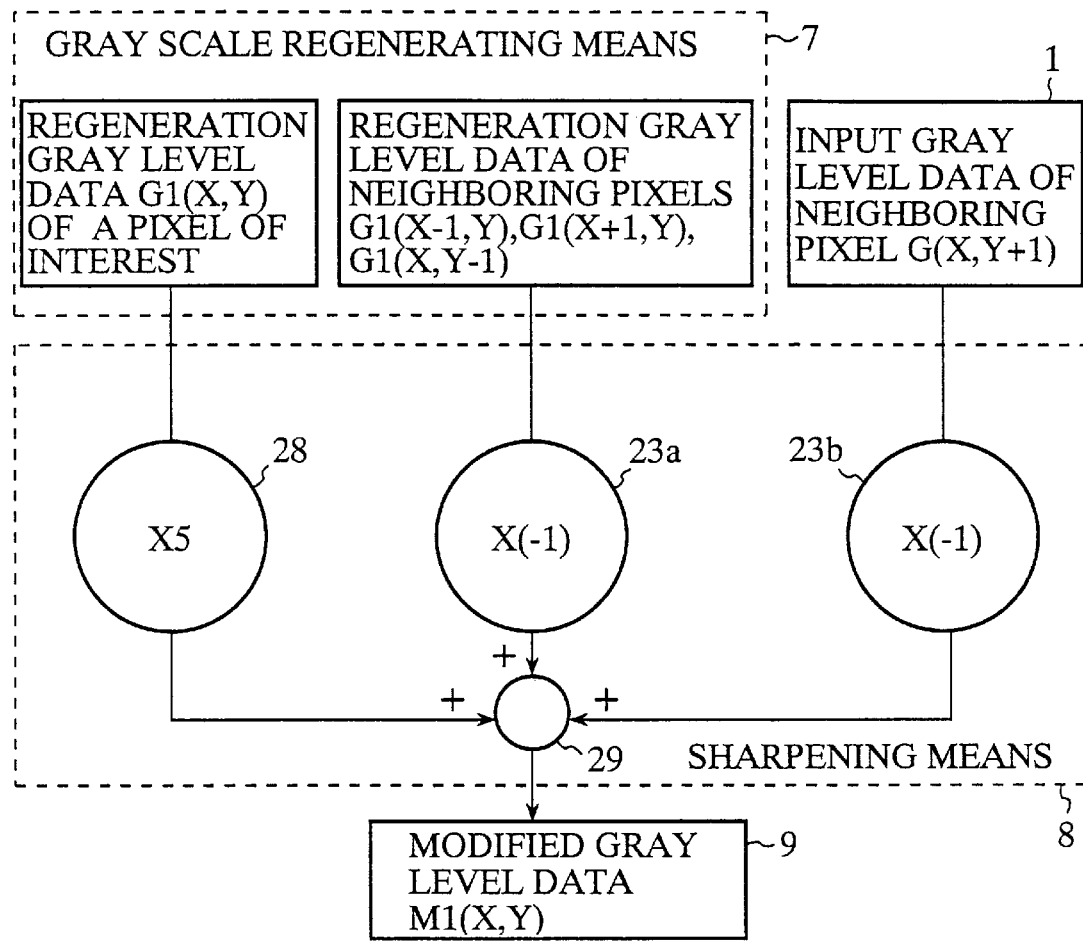
FIG. 6 is a block diagram showing a sharpening means 8 of FIG. 1.

FIG. 6 is a block diagram showing the sharpening means 8 in detail. Receiving the gray level data of the pixel of interest and its neighboring pixels, the sharpening means 8 sharpens the image by adding, to the gray level data of the pixel of interest, differential gray level data obtained as the differences between the pixel of interest and the neighboring pixels. In the present embodiment 1, the gray level data of the pixel of interest and its neighboring pixels are selected from the regeneration gray level data G1(m,n) fed from the gray scale regenerating means 7, except for the latest input gray level data G(X,Y+1) of the pixel P(X,Y+1) which is fed from the input buffer 1. In FIG. 6, the reference numeral 28 designates a multiplier for multiplying the gray level data (regeneration gray level data G1(X,Y)) of the pixel of interest P(X,Y) by five; 23a designates a first sign inverter for inverting the signs of the gray level data (regeneration gray level data G1(X−1,Y), G1(X+1,Y) and G1(X,Y−1)) of the neighboring pixels P(X−1,Y), P(X+1,Y) and P(X,Y−1)) fed from the gray scale regenerating means 7; 23b designates a second sign inverter for inverting the signs of the gray level data (input gray level data G(X,Y+1)) of the neighboring pixel P(X,Y+1) fed from the input buffer 1; and 29 designates an adder for summing up the gray level data of the pixels, outputting the sum as the modified gray level data M1(X,Y).

Next, the operation of the sharpening means 8 will be described.

When the gray level data of the required pixels become available, the multiplier 28 multiplies the gray level data G1(X,Y) of the pixel of interest P(X,Y) by five. On the other hand, the sign inverters 23a and 23b invert the signs of the gray level data of the neighboring pixels. Then, the adder 29 sums up the entire gray level data obtained. Therefore, the modified gray level data M1(X,Y) is represented by the following equation (10).

$$M1(X,Y)=5\times G1(X,Y)-G1(X-1,Y)-G1(X+1,Y)-G1(X,Y-1)$$
$$-G1(X,Y+1)=G1(X,Y)+\{G1(X,Y)-G1(X-1,Y)+G1(X,Y)-G1(X+1,Y)$$
$$+G1(X,Y)-G1(X,Y-1)+G1(X,Y)-G1(X,Y+1)\} \quad (10)$$

Figure 7:
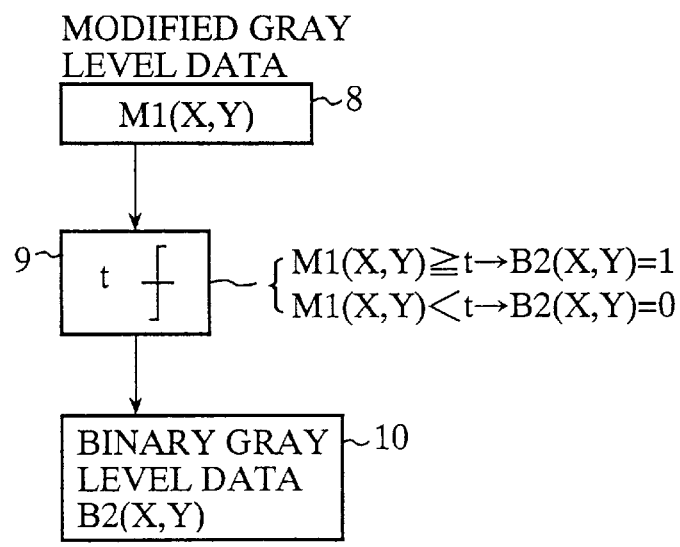
FIG. 7 is a block diagram showing a quantization means 9 of FIG. 1.

FIG. 7 is a block diagram showing the quantization means 9 in detail. The quantization means 9 converts the modified gray level data M1(X,Y) fed from the sharpening means 8 into the binary gray level data B2(X,Y) using the predetermined threshold value t, and outputs it as the binary gray level data B2(X,Y) of the pixel of interest P(X,Y). In the present embodiment 1, as the temporary quantization means 3 shown in FIG. 3, the quantization means 9, having set the threshold value t at the median (128) of the 8-bit gradation, outputs the binary gray level data B2(X,Y) with a value of "1" if the input modified gray level data M1(X,Y) is equal to or greater than the threshold value, and outputs the binary gray level data B2(X,Y) with a value of "0" if the input modified gray level data M1(X,Y) is less than the threshold value. Then, the output buffer 10 produces the binary gray level data B2(X,Y) as the gray scale reduced gray level data of the pixel of interest P(X,Y).

Next, the memory structures of the error data storing means 5 and temporary binary gray level data storing means 6 of the present embodiment 1 will be described.

Figure 8:
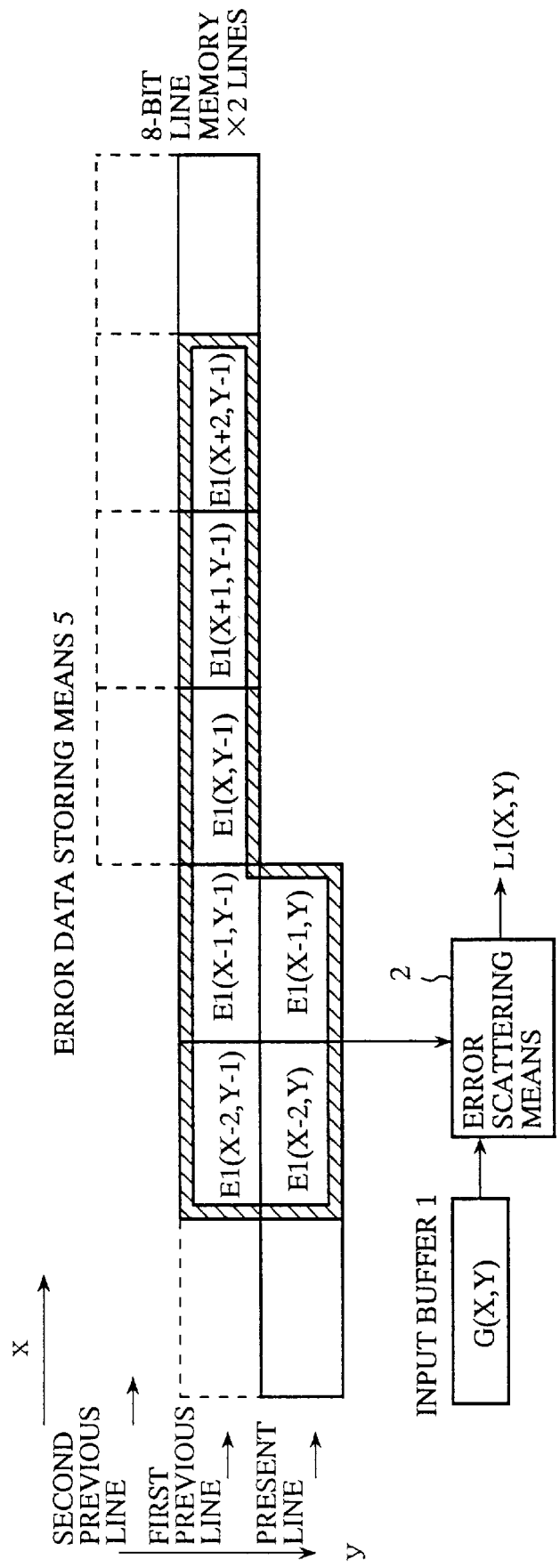
FIG. 8 is a diagram showing relationships between the memory structure of an error data storing means 5 of FIG. 1 and the error scattering.

FIG. 8 is a block diagram showing the error data storing means 5 and the error scattering means 2 utilizing the quantization error data E1(m,n) stored therein. FIG. 8 is depicted based on the assumption that "the gray level data of pixels are output in the order of pixels P(0,0), P(1,0), P(2,0), . . . , P(M,0), P(0,1), P(1,1), . . . , P(M,1), P(0,2), . . . , P(M,N)". The error scattering means 2 requires, when carrying out the error scattering associated with the pixel P(X,Y), the quantization error data of the pixels shaded in FIG. 8. Thus, to achieve the successive processing by the error scattering means 2 of the pixels of a single line from P(0.n) to P(M,n), it is necessary for the error data storing means 5 to store the quantization error data of the line previous to that of the pixel of interest plus two pixels (this condition is termed a memory prerequisite 1 from now on).

Figure 9:
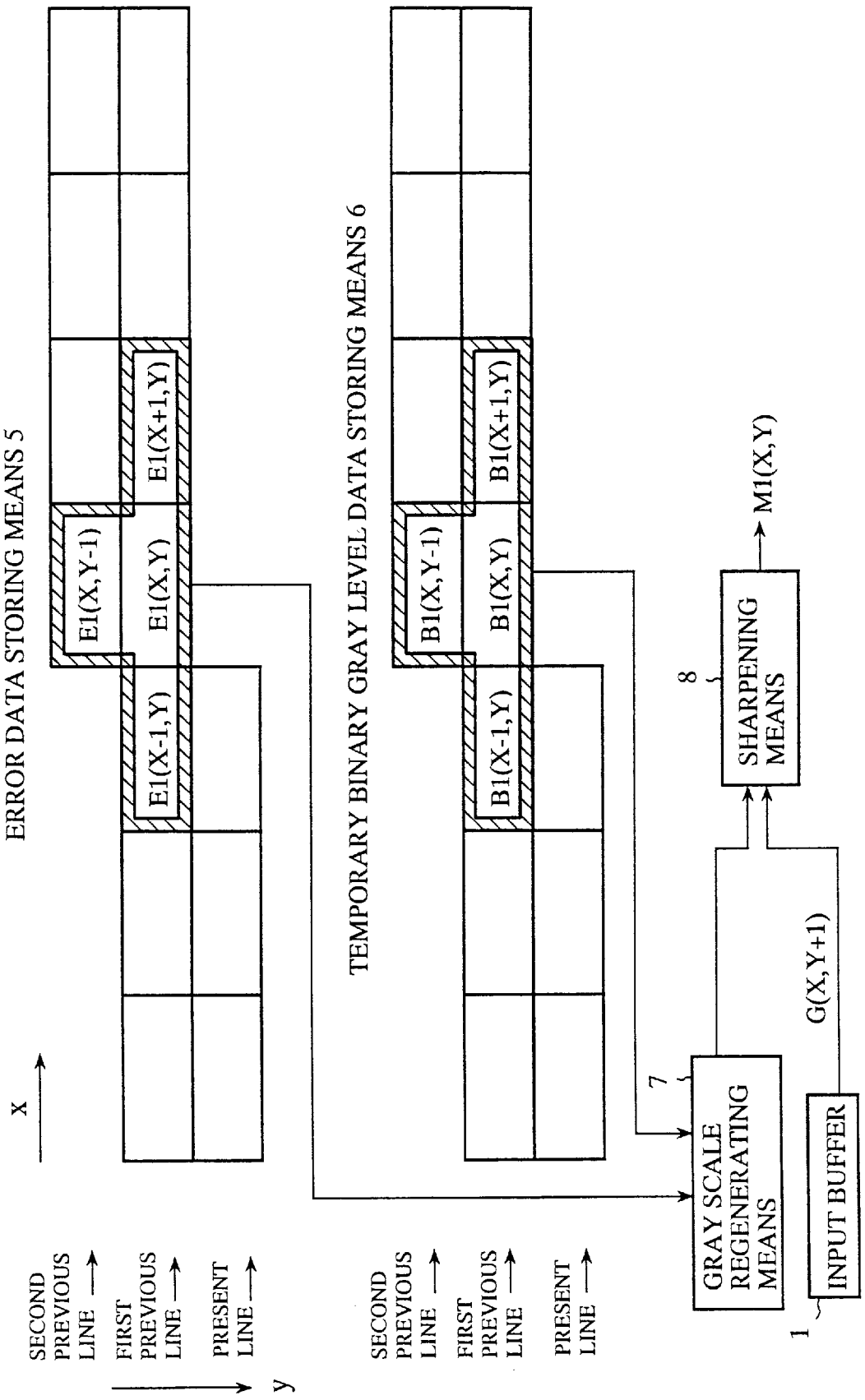
FIG. 9 is a diagram showing relationships between the memory structures of the error data storing means 5 and temporary binary gray level data storing means 6 and the gray level regenerating and sharpening.

FIG. 9 is a block diagram showing the memories and their periphery, that is, the two storing means 5 and 6, the gray scale regenerating means 7 and sharpening means 8 extracted from FIG. 1. Since the sharpening means 8 performs the filtering of the pixel P(X,Y) at the timing when the input gray level data G(X,Y+1) of the pixel P(X,Y+1) is fed from the input buffer 1, the storing means 5 and 6 require the quantization error data of the shaded pixels in FIG. 9. Thus, to achieve the successive processing by the sharpening means 8 of the pixels of the single line, it is necessary for each of the storing means 5 and 6 to store the data of the two lines previous to the line including the pixel P(X,Y+1) fed from the input buffer 1 (this condition is termed a memory prerequisite 2 from now on). Here, the storing means each consist of a static RAM in the present embodiment 1.

According to the present embodiment 1, in implementing the gray level reduction of the input image, the quantization error scattering and sharpening (filtering) are carried out prior to the quantization. This makes it possible to obtain the binary image not inferior to the conventional one in its quality.

In the gray scale reduction, the storing means 5 and 6 must each satisfy the memory prerequisites 1 and 2. Thus, it is necessary for each of the storing means 5 and 6 to store the pixel data of the two lines as can be seen from FIGS. 8 and 9. In the present embodiment 1, since each of the quantization error data E1(X,Y) is represented by eight bits like the input gray level data G(X,Y) and each of the temporary binary gray level data B1(X,Y) is represented by one bit, the total memory capacity Mmin required by the two storing means 5 and 6 becomes as follows in the case of B4 size and 200 dpi in which each line consists of 2048 pixels.

$$\text{Mmin}=2048(\text{pixels})\times 2(\text{lines})\times \{8+1(\text{bits})\}=36,864(\text{bits}) \quad (11)$$

Thus, comparing with a conventional gray scale reduction processor for reducing data from 8-bit to 1-bit which requires 49,168 bits as shown by expression (4), the present embodiment 1 can reduce the memory capacity by an amount of no less than 12,304 bits, or about 25%. Since the memory means requires a maximum area in an integrated circuit, the present embodiment 1 can substantially reduce its size and cost.

EMBODIMENT 2

Figure 10:
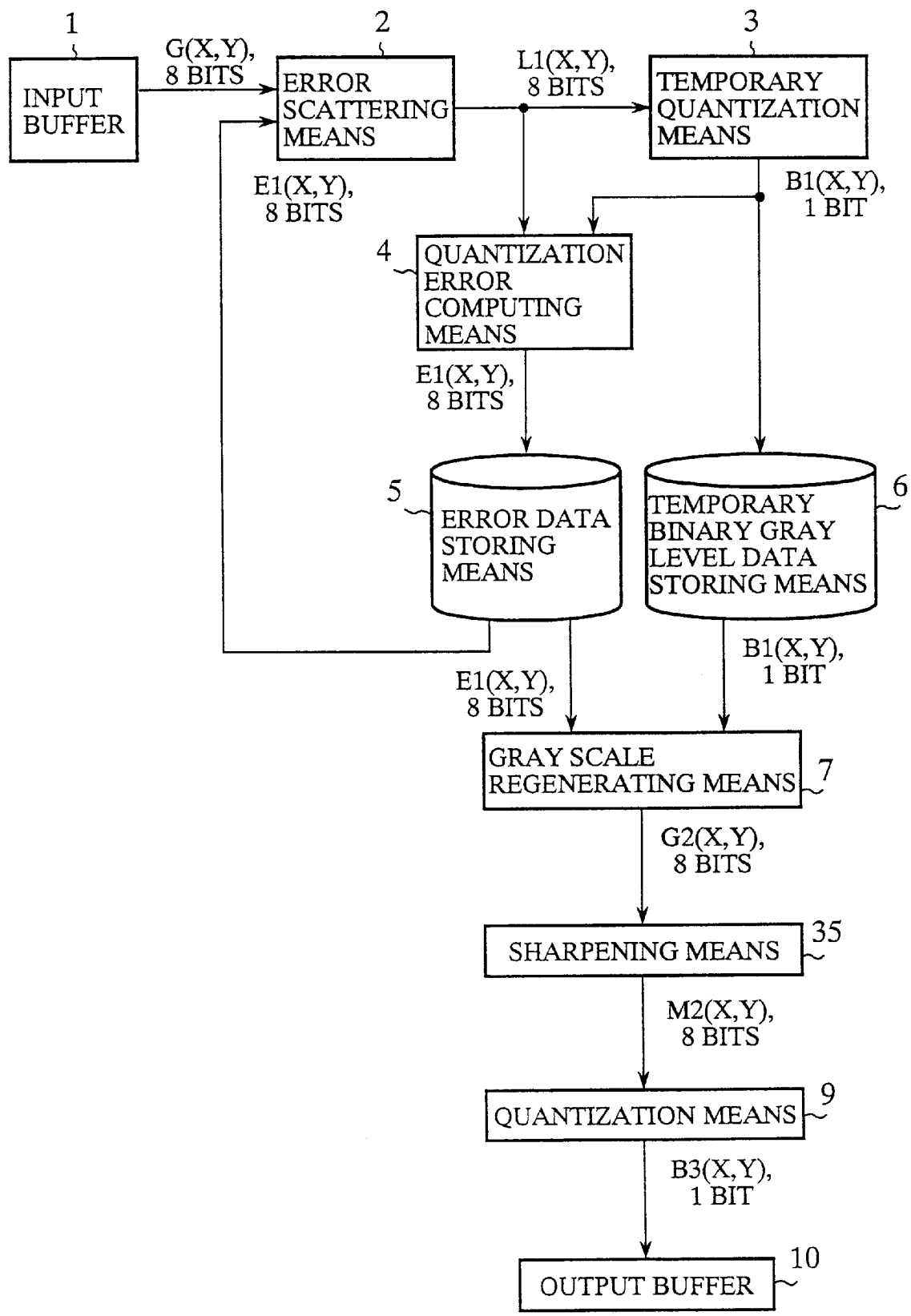
FIG. 10 is a block diagram showing an embodiment 2 of a gray scale reduction integrated circuit in accordance with the present invention.

FIG. 10 is a block diagram showing an embodiment 2 of a gray scale reduction integrated circuit (gray scale reduction processor) in accordance with the present invention. In FIG. 10. the reference numeral 35 designates a sharpening means for carrying out the sharpening (filtering) using only the regeneration gray level data fed from the gray scale regenerating means 7. The contents of the sharpening itself by the sharpening means 35 is the same as that of FIG. 6, excluding that the first sign inverter 23*a* and second sign inverter 23*b* of FIG. 6 are made common in the sharpening means 35. This modification results in one pixel delay in the timing of processing the pixels by the sharpening means 35 as compared with that of the sharpening means 8 in the embodiment 1, and an increase of one pixel in the number of stored pixels in each of the storing means 5 and 6. The remaining configuration and the operation are the same as those of the embodiment 1.

According to the embodiment 2, the total memory capacity Mmin required by the two storing means 5 and 6 under the same image prerequisites as those of the embodiment 1 becomes as follows.

$$Mmin=\{2048(pixels)\times 2(lines)+1(pixel)\}\times\{8+1(bits)\}= 36,873(bits) \qquad (12)$$

Thus, comparing with a conventional gray scale reduction processor, the present embodiment 2 can reduce the memory capacity by an amount of no less than 12,295 bits or about 25%. Accordingly, the present embodiment 2 can substantially reduce its size and cost. In addition, since it is not necessary to establish complete synchronization between the operation timings of the respective means when inputting different gray level data to the sharpening means 35 as in the embodiment 1, the circuit configuration can be simplified.

EMBODIMENT 3

Figure 11:
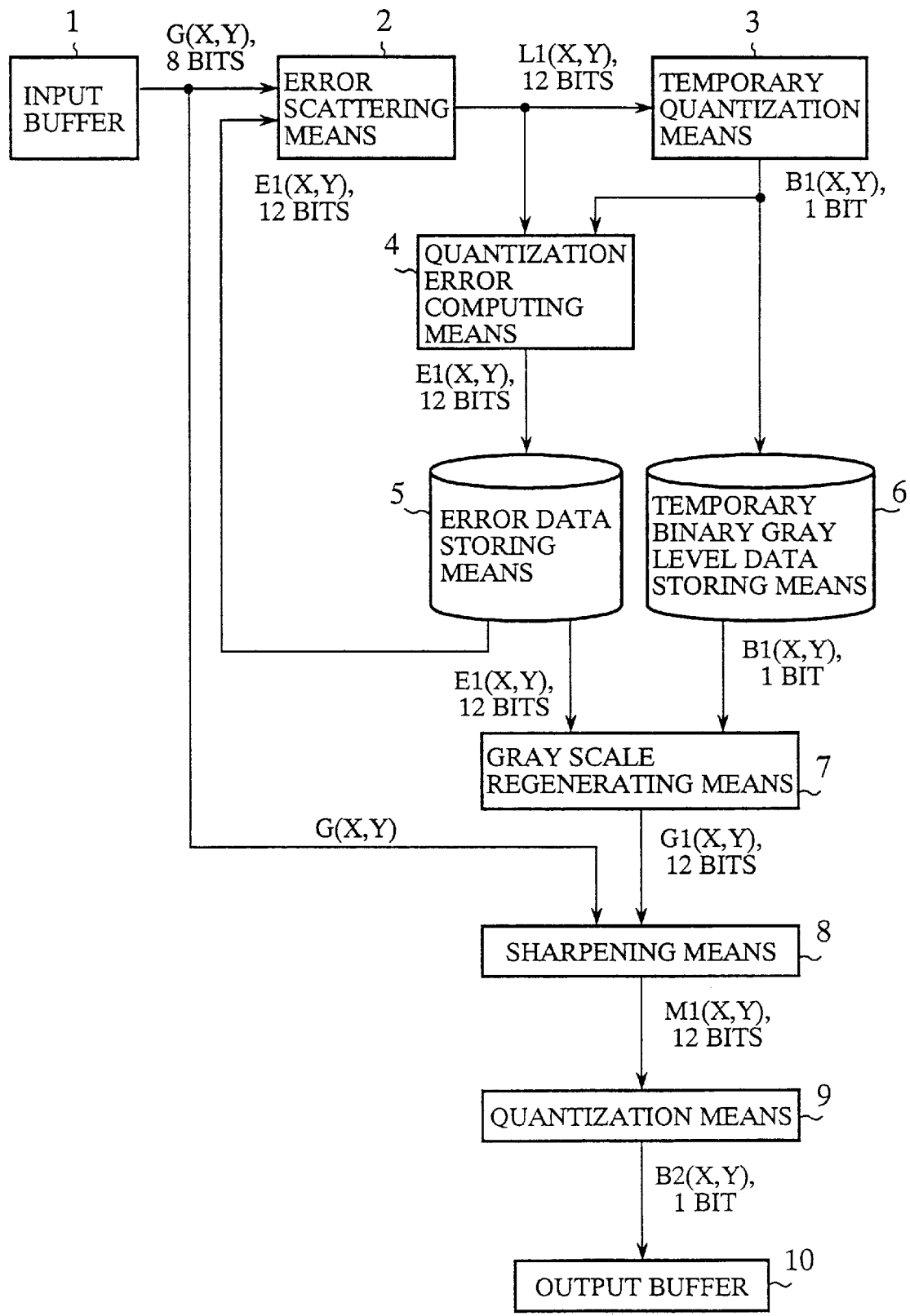
FIG. 11 is a block diagram showing an embodiment 3 of a gray scale reduction integrated circuit in accordance with the present invention.

FIG. 11 is a block diagram showing an embodiment 3 of a gray scale reduction integrated circuit (gray scale reduction processor) in accordance with the present invention. This embodiment differs from the foregoing embodiments in that the error scattered gray level data, quantization error data, regeneration gray level data and modified gray level data each consist of 12-bit gray level data.

Accordingly, the total capacity Mmin of the two storing means 5 and 6 is given by the following equation (13) when each line consists of 2048 pixels as in the embodiment 1.

$$Mmin=2048(pixels)\times 2(lines)\times\{12+1(bits)\}=53,248(bits) \qquad (13)$$

Thus, although this embodiment 3 requires the memory capacity comparable to that of the conventional gray scale reduction processor which reduces the 8-bit data to 1-bit data, it can improve the image quality as compared with the embodiment 1 and others because it carries out the quantization error calculation and sharpening using data with greater number of gray levels than that of the input gray level data.

EMBODIMENT 4

Figure 12:
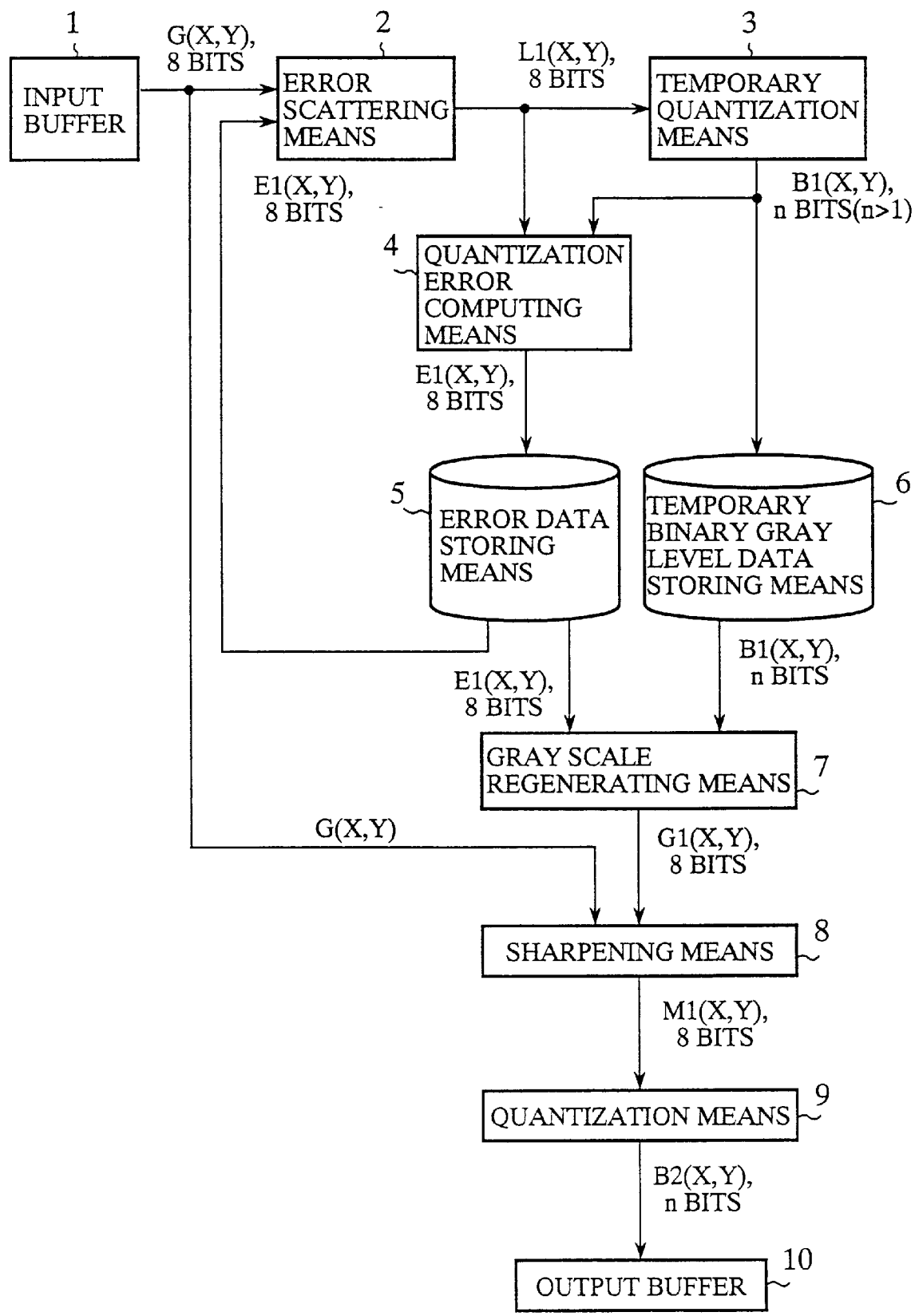
FIG. 12 is a block diagram showing an embodiment 4 of a gray scale reduction integrated circuit in accordance with the present invention.

FIG. 12 is a block diagram showing an embodiment 4 of a gray scale reduction integrated circuit (gray scale reduction processor) in accordance with the present invention. This embodiment 4 differs from the foregoing embodiments in that the temporary quantization gray level data $B1(X,Y)$ and quantization gray level data $B2(X,Y)$ are each altered from 1-bit to n-bit gray level data, where $n>1$.

Accordingly, the total memory capacity Mmin of the two storing means 5 and 6 is given by the following equation (14) when each line consists of 2048 pixels as in the embodiment 1 and $n=2$.

$$Mmin=2048(pixels)\times 2(lines)\times\{8+2(bits)\}=40,960(bits) \qquad (14)$$

Thus, comparing with a conventional gray scale reduction processor, the present embodiment 4 can reduce the memory capacity by an amount of no less than 12,295 bits or about 25%. Accordingly, the present embodiment 4 can reduce its size considerably and make it less expensive.

EMBODIMENT 5

Figure 13:
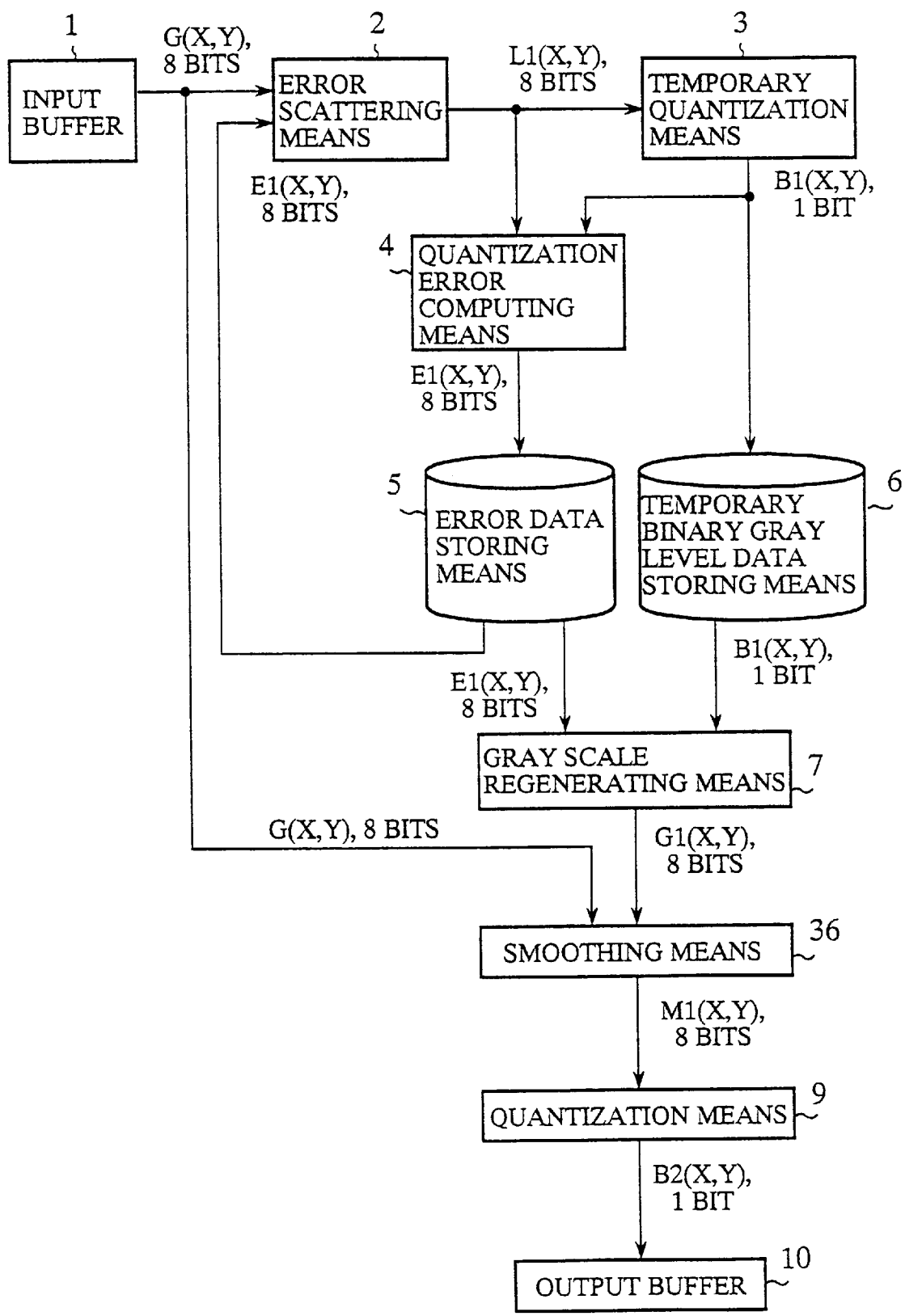
FIG. 13 is a block diagram showing an embodiment 5 of a gray scale reduction integrated circuit in accordance with the present invention.
Figures 14, 16:
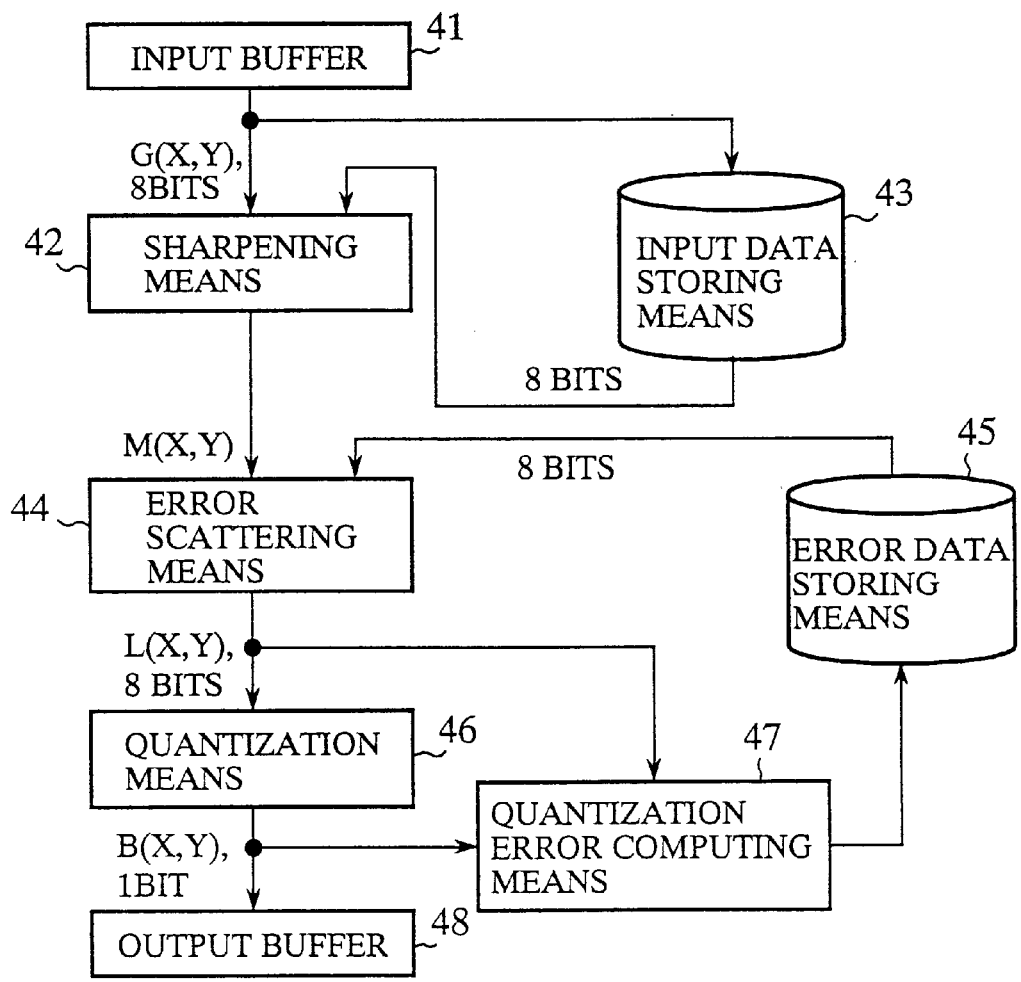
FIG. 14 is a matrix diagram illustrating an example of a smoothing filter used in a smoothing means of FIG. 13.
FIG. 16 is a block diagram showing a conventional gray scale reduction apparatus.

FIG. 13 is a block diagram showing an embodiment 5 of a gray scale reduction integrated circuit (gray scale reduction processor) in accordance with the present invention. In this figure, the reference numeral 36 designates a smoothing means (filtering means) for smoothing, when the gray level data of the pixel of interest $P(X,Y)$ and its neighboring pixels are input, the image by adding, to the gray level data of the pixel of interest $P(X,Y)$, integral gray level data obtained as the difference between the pixel of interest and the neighboring pixels. The neighboring pixels used in the filtering are pixels at the above and below, and left and right positions of the pixel of interest as in the embodiment 1. The integration is carried out using the smoothing filter matrix as shown in FIG. 14, and its result is added to the gray level data of the pixel of interest $P(X,Y)$. The filter as shown in FIG. 14 is generally called an averaging filter.

The remaining configuration and operation are the same as those of the embodiment 1.

Thus, comparing with a conventional gray scale reduction processor, the present embodiment 5 can reduce the memory capacity by an amount of no less than 12,295 bits or about 25% as in the embodiment 1. Accordingly, the present embodiment 5 can substantially reduce its size and make it less expensive.

Furthermore, substituting the smoothing for the sharpening enables the processing for handling scenic or natural images to obtain binary images better than those of the embodiment 1.

EMBODIMENT 6

Figure 15:
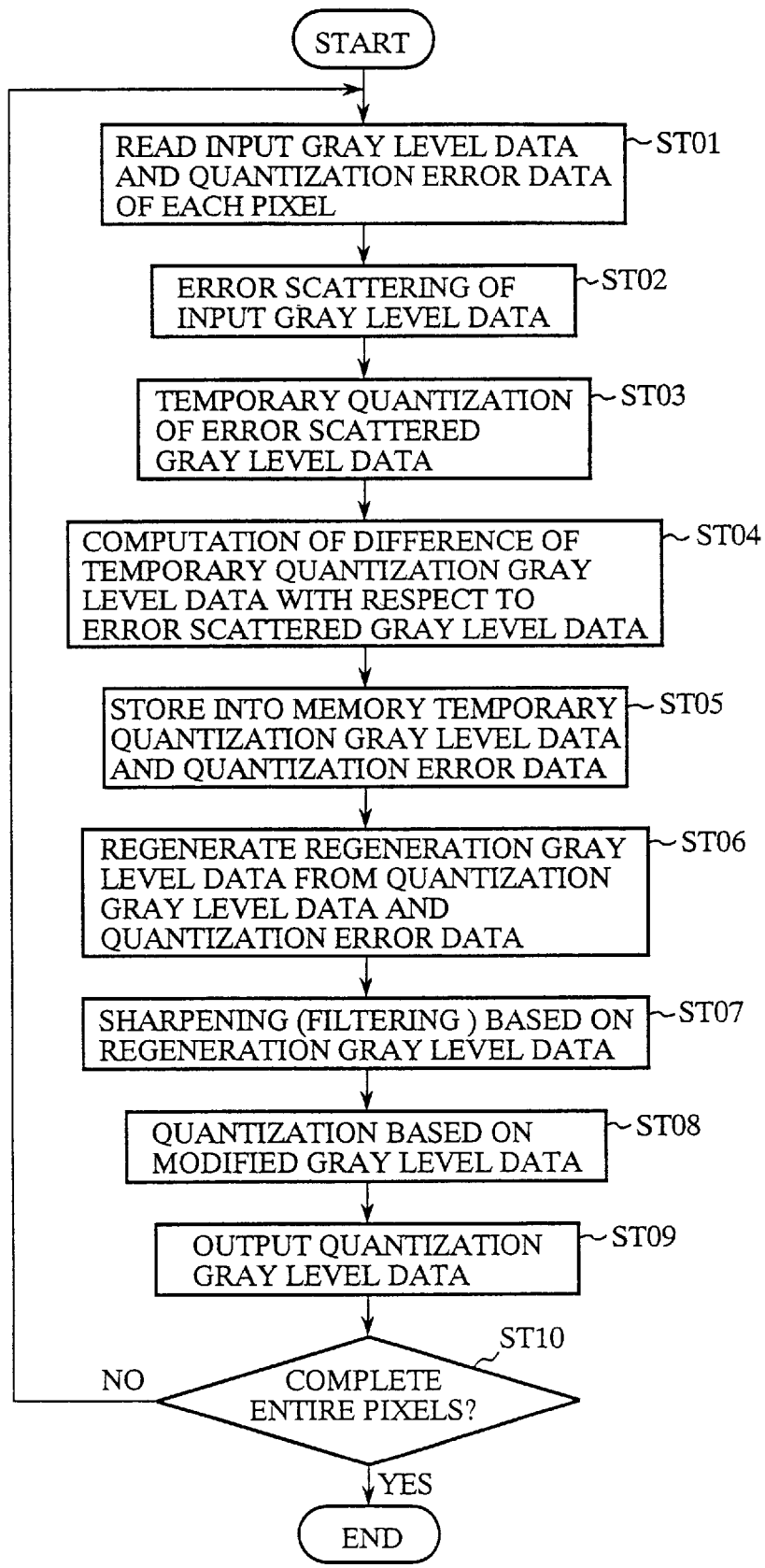
FIG. 15 is a flowchart showing a gray scale reduction program associated with an embodiment 6 in accordance with the present invention.
Figure 20:
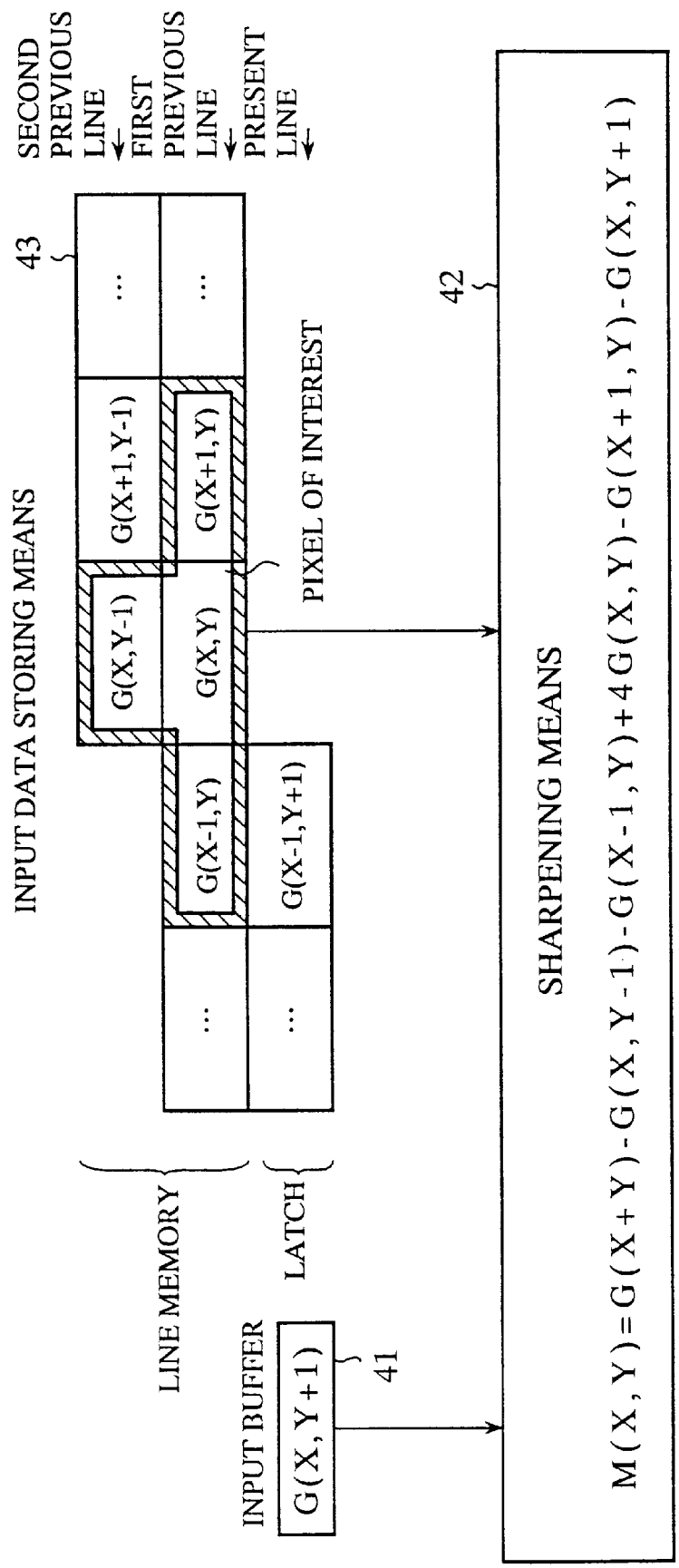
FIG. 20 is a diagram showing relationships between the memory structure of a conventional input data memory means of FIG. 16 and the sharpening (filtering)
Figure 23:
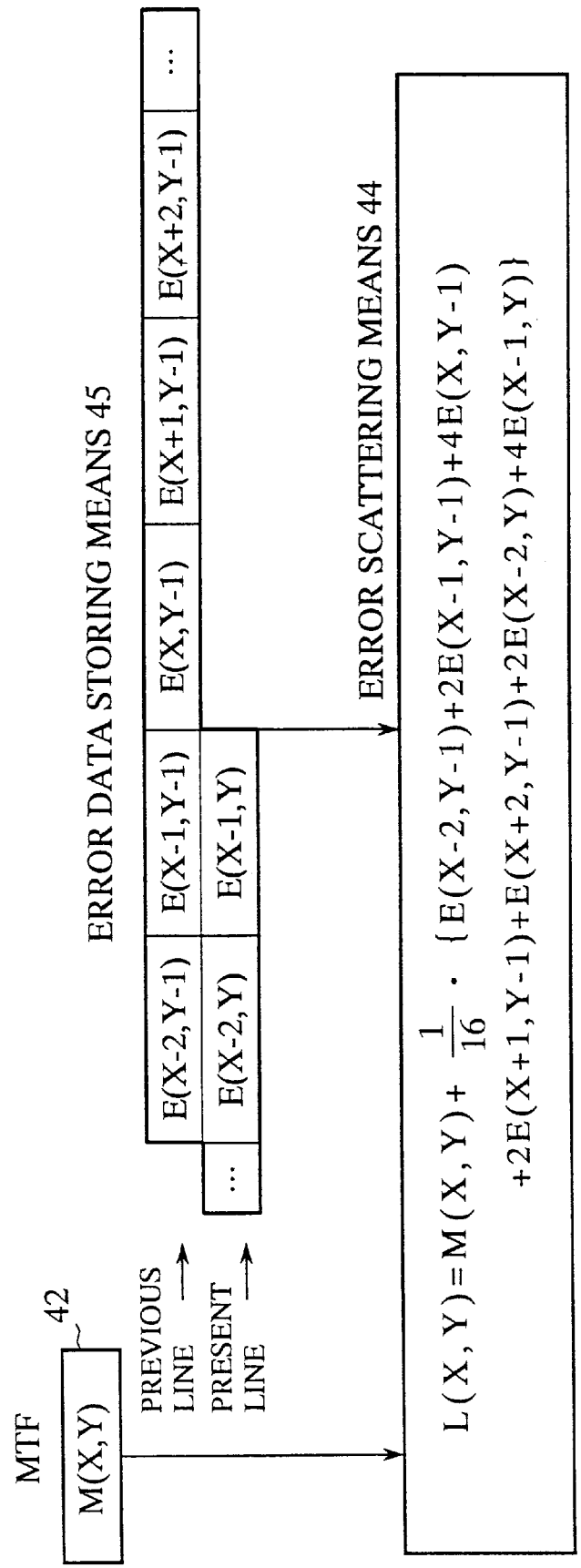
FIG. 23 is a diagram illustrating relationships between the memory structure of the error data storing means of FIG. 16 and the error scattering.

FIG. 15 is a flowchart of a computer readable medium recording a gray scale reduction program associated with an embodiment 6 in accordance with the present invention. In FIG. 15, step ST01 is a read out step of reading gray level data of each pixel of an input image and quantization error data of its neighboring pixels. Step ST02 is an error scattering functional step of performing error scattering calculation on the gray level data of the input pixel using the above mentioned data. Step ST03 is a temporary quantization functional step of performing temporary quantization of the error scattered gray level data. Step ST04 is a quantization error computing functional step of computing differences of the temporary quantization gray level data against the error scattered gray level data. Step ST05 is a storing functional step (error data storing function and temporary quantization gray level data storing function) of storing in a memory the quantization error data and temporary quantization gray level data. Step ST06 is a gray scale regeneration functional step of performing calculation for regenerating the gray level data of the pixel by retrieving the temporary quantization gray level data and quantization error data. Step ST07 is a filtering functional step of performing sharpening (filtering) based on the regeneration gray level data. Step ST08 is a binarization functional step (quantization function) of outputting binary gray level data corresponding to a decision made by comparing the modified gray level data obtained by the sharpening with a threshold value. Step ST09 is an output functional step of outputting the binary gray level data to a memory or the like, and step ST10 is a process completion decision step of making a decision whether the processings from step ST01 to ST09 have been completed about the entire pixels of the input image, and repeats the processings until they have been completed.

Thus, according to the present embodiment 6, the total memory capacity Mmin required under the same image prerequisites as those of the embodiment 1 is given by the following equation (15).

$$M_{min}=\{2048(\text{pixels})\times2(\text{lines})\times1(\text{pixel})\}\times\{8+1(\text{bits})\}=36,873(\text{bits}) \quad (15)$$

Thus, comparing with a conventional gray scale reduction processor, the present embodiment 6 can reduce the memory capacity by an amount of no less than 12,295 bits or about 25%. Accordingly, the present embodiment 6 can substantially reduce its memory capacity required by the computer and implement the processings at a lower cost. In addition, although the conventional system cannot be implemented without using a virtual memory or the like, the processings of the present embodiment can be implemented at higher processing speed without employing the virtual memory because it can be implemented with a memory of a smaller capacity.

What is claimed is:

1. A gray scale level reduction method for producing an output image with a reduced number of gray levels, the gray scale reduction method comprising:

quantization error scattering input gray level data of an input image including a plurality of pixels, wherein the quantization error scattering includes obtaining temporary quantization gray level data and quantization error data for each pixel of the input image, wherein obtaining the temporary quantization gray level data includes error scattering the input gray level data to produce error scattered gray level data and temporarily quantizing the error scattered gray level data to produce the temporary quantization gray level data, and obtaining the quantization error data includes computing a difference between the temporary quantization gray level data and the input gray level data;

storing the temporary quantization gray level data and the quantization error data;

regenerating gray level data from the temporary quantization gray level data and the quantization error data and outputting regenerated gray level data as gray level data for each pixel;

filtering data produced by the quantization error scattering, after completing the quantization error scattering, including filtering the regenerated gray level data for each pixel and outputting filtered data as modified gray level data; and quantizing the modified gray level data, and outputting quantized gray level data having a smaller number of gray levels than the input image.

2. The gray scale level reduction method as claimed in claim 1, wherein filtering data includes utilizing only the regenerated gray level data as gray level data of a plurality of pixels used for the filtering.

3. The gray scale level reduction method as claimed in claim 1, wherein filtering data includes utilizing data selected from the input gray level data as gray level data of a particular pixel being processed, and data selected from the regenerated gray level data as gray level data of all remaining pixels being processed.

4. The gray scale level reduction method as claimed in claim 1, wherein a pixel of interest in filtering the data is a pixel one line previous to a pixel of interest in quantization error scattering of the input gray level data.

5. A gray scale level reduction apparatus comprising:

error scattering means for sequentially receiving input gray level data for each pixel of an input image, and for producing error scattered gray level data by quantization error scattering the input gray level data for each pixel of the input image;

temporary quantization means for producing temporary quantization gray level data by temporarily quantizing the error scattered gray level data;

quantization error computing means for producing quantization error data corresponding to a difference between the temporary quantization gray level data and the error scattered gray level data;

error data storing means for storing the quantization error data, and for supplying the quantization error data to said error scattering means;

temporary quantization gray level data storing means for storing the temporary quantization gray level data;

gray level regenerating means for regenerating gray level data from the temporary quantization gray level data and the quantization error data stored in said error data storing means and said temporary quantization gray level storing means, and outputting the regenerated gray level data as gray level data for each pixel;

filtering means for filtering the input gray level data based on the regenerated gray level data, and for outputting filtered data as modified gray level data; and quantization means for quantizing the modified gray level data, and for outputting quantized gray level data having a smaller number of gray levels than the input image.

6. The gray scale level reduction apparatus as claimed in claim 5, wherein said filtering means filters each pixel of the input gray level data using only the regenerated gray level data received from said gray level regenerating means.

7. The gray scale level reduction method as claimed in claim 5, wherein said filtering means filters each pixel of the input gray level data using data selected from the input gray level data as gray level data of a particular pixel being processed, and data selected from the regenerated gray level data as gray level data of all remaining pixels being processed, and wherein a pixel of interest in the filtering is a pixel one line previous to a pixel of interest processed by said error scattering means.

8. The gray scale level reduction apparatus as claimed in claim 5, wherein said filtering means sharpens the input gray level data based on the regenerated gray level data.

9. The gray scale level reduction apparatus as claimed in claim 5, wherein said filtering means smoothes the input gray level data based on the regenerated gray level data.

10. The gray scale level reduction apparatus as claimed in claim 5, wherein said gray scale reduction apparatus converts the input gray level data for each pixel of the input image into one-bit gray level data to be output.

11. The gray scale level reduction apparatus as claimed in claim 5, wherein said gray scale reduction apparatus converts the input gray level data for each pixel of the input image into gray level data to be output.

12. The gray scale level reduction apparatus as claimed in claim 5, wherein each of said error data storing means and said temporary quantization gray level data storing means comprises a line memory.

13. The gray scale level reduction apparatus as claimed in claim 5, wherein the quantization error data has more bits than the input gray level data.

14. The gray scale level reduction apparatus as claimed in claim 5, wherein the gray scale reduction apparatus comprises an integrated circuit.

15. A computer usable medium having computer readable program code means embodied in the medium for gray scale reduction of an input image, said readable computer program code means comprising:

error scattering means for sequentially receiving input gray level data for each pixel of an input image, and for producing error scattered gray level data by quantization error scattering the input gray level data for each pixel of the input image;

temporary quantization means for producing temporary quantization gray level data by temporarily quantizing the error scattered gray level data;

quantization error computing means for producing quantization error data corresponding to a difference between the temporary quantization gray level data and the error scattered gray level data;

error data storing means for storing the quantization error data, and for supplying the quantization error data to said error scattering means;

temporary quantization gray level data storing means for storing the temporary quantization gray level data;

gray level regenerating means for regenerating gray level data from the temporary quantization gray level data and the quantization error data stored in said error data storing means and said temporary quantization gray level data storing means and outputting the regenerated gray level data as gray level data for each pixel;

filtering means for filtering the input gray level data based on the regenerated gray level data, and for outputting filtered input gray level data as modified gray level data; and quantization means for quantizing the modified gray level data, and for outputting quantized gray level data with a smaller number of gray levels than the input image.

* * * * *